US006168409B1

(12) United States Patent
Fare

(10) Patent No.: US 6,168,409 B1
(45) Date of Patent: Jan. 2, 2001

(54) APPARATUS FOR MAKING TWO COMPONENT FIBERS OR CONTINUOUS FILAMENTS USING FLEXIBLE TUBE INSERTS

(76) Inventor: Rosaldo Fare, Via Pastrengo, 31, 21054 Fagnano Olano (IT)

( * ) Notice: Under 35 U.S.C. 154(b), the term of this patent shall be extended for 0 days.

(21) Appl. No.: 09/191,663

(22) Filed: Nov. 13, 1998

(51) Int. Cl.[7] ................................................. B29C 47/22
(52) U.S. Cl. .................................... 425/131.5; 425/133.1; 425/192 S; 264/172.15
(58) Field of Search ........................... 425/131.5, 382.2, 425/463, 192 S, 133.1; 264/172.15

(56) References Cited

U.S. PATENT DOCUMENTS

| | | | |
|---|---|---|---|
| 3,540,080 | * 11/1970 | Goossens | 18/8 |
| 3,556,635 | * 1/1971 | Schrenk et al. | 350/96 |
| 4,445,833 | * 5/1984 | Moriki et al. | 425/131.5 |
| 4,846,653 | * 7/1989 | Beck et al. | 425/131.5 |

* cited by examiner

*Primary Examiner*—Harold Pyon
*Assistant Examiner*—Joseph S Del Sole
(74) *Attorney, Agent, or Firm*—Kennedy Covington Lobdell & Hickman, L.L.P.

(57) ABSTRACT

Apparatus for making two component fibers or continuous filaments which includes a pre-die plate having first openings through which a component flows to aligned second openings in a die juxtaposed the pre-die plate, and a flexible tube member extending from the first openings into the second openings to accommodate any misalignment of the first openings relative to the second openings without adversely affecting the flow of the two fiber components.

6 Claims, 2 Drawing Sheets

APPARATUS FOR MAKING TWO COMPONENT FIBERS OR CONTINUOUS FILAMENTS USING FLEXIBLE TUBE INSERTS

BACKGROUND OF THE INVENTION

The present invention relates generally to an apparatus and method for the formation of a fiber or continuous filament, and more particularly to the formation of a fiber which consist of two separate and different components.

It is well known to form synthetic fibers by extruding molten polymers through a large number of very small openings formed in a die.

It is also well known that such synthetic fibers can be formed of two polymer components having different characteristics and physical properties, such as so-called "sheath-core" fibers that have one component (the core) centered within the other (the sheath). In forming these sheath-core fibers, it is very important that the core be centered within the sheath because if the core is offset from the center by even a slight amount, the quality and physical properties of the resulting fiber can be seriously flawed.

In forming these sheath-core fibers, it is common practice to provide a pre-die plate which is formed with a first plurality of openings extending therethrough and through which one of the components flow, and a second die plate having a second plurality of openings through which the second component flows as it becomes joined with the first component and is discharged through the bottom or discharge openings in the die plate in the aforesaid sheath-core configuration.

It will therefore be apparent that the alignment between the first and second plurality of openings in the pre-die plate and the die plate can be critical because if the first openings are slightly misaligned with respect to the second openings, the core component will not be centered with respect to the second component, and the resulting fiber may have the aforesaid disadvantages.

When it is recognized that both the pre-die plate and the die plate are formed with an inordinately large number of openings extending therethrough, all of which are very small, it will be quickly apparent that the tolerances involved are quite close. Therefore a slight misalignment between these small openings is always possible.

Moreover, this problem is greatly exacerbated by the fact that the fiber components must be maintained in their molten state during their flow through the two plates, which therefore may reach also very high temperatures (up to 350° C.), still considering the different melting grades of the two components.

Since the plates are formed of steel, these elevated temperatures (and their inherent variations), cause the dimensions of the plates to change, either through expansion or contraction, and these changes can move one set of openings in one of the plates relative to the openings in the other plate, which can create a very undesirable misalignment of the two sets of openings.

Accordingly, there is a need in the art to provide a simple and reliable method and apparatus which will compensate for any misalignment between the openings in the two plates, and will insure that the core component will be centered with respect to the sheath component.

SUMMARY OF THE INVENTION

In accordance with the present invention, an apparatus is provided for making fibers or continuous filaments consisting of first and second components, such apparatus including a first plate having an inlet for receiving the first fiber component, and having a first plurality of openings through which the said first fiber component flows to an outlet end of the openings. A second plate is juxtaposed with said first plate and has a second plurality of openings therein which are generally axially aligned with the said first plurality of openings in said first plate, and the said second plate having a flow channel that permits the said second fiber component to flow to the second openings and out through an outlet end of the said second openings.

A plurality of flexible hollow tube members are mounted to extend axially into the second plurality of openings with one end of each of the flexible tube members being located adjacent the outlet end of one of the first openings and with the other end of each of the flexible tube member being located adjacent the outlet end of the said second openings. The flexible tube members present a cross-sectional area less than the cross sectional area of the second openings, and they are sufficiently flexible to accommodate any misalignment between the said first and second openings without adversely affecting the flow of the first and second components.

In the preferred embodiment of the apparatus of the present invention, each of the flexible tube members has centering vanes located at the aforesaid other end thereof which extend outwardly and into engagement with the walls of the second openings, and these vanes are dimensioned to center such other end of the flexible tube member in the second opening, and to maintain such other end of each flexible tube member axially aligned with the second openings even if such one end of the flexible tube member is not axially aligned with the second opening.

Preferably, the flexible tube members are mounted in the first openings of the first plate at the outlet end thereof.

Also, in the preferred embodiment of the present invention, the second plate includes die openings adjacent the outlet end of the second openings and communicating therewith so that the second component flows from the second openings into the die opening, and the other end of each flexible tube member has a discharge opening directing the flow of the first fiber component into the die opening within the flow of the second fiber component to thereby form a sheath-core fiber or continuous filament.

The present invention also includes a method of forming a fiber or a continuous filament from two fiber components comprising the steps of positioning a first upper plate having a plurality of first openings therein immediately adjacent a second lower plate having a plurality of second openings therein and a plurality of die openings in the bottom face thereof, with said first and second opening being generally axially aligned. The method includes the step of positioning a plurality of flexible hollow tube members so that one end of each flexible tube member is in communication with each of the first openings, and so that the flexible tube members extend into the second openings generally in axial alignment therewith, with each flexible tube member having a cross-sectional area less than the cross-sectional area of said second openings to form a flow channel therebetween. The same method includes the step of causing the flexible tube members to flex adjacent the upper ends thereof to accommodate any axial misalignment between said first and second openings.

The method also includes the steps of creating a first flow path for the first fiber component that extends through the first openings and through the interior of said flexible hollow tube members to be discharged from the flexible hollow tube members and through the die openings; and creating a second flow path for the second fiber component that extends through the second openings and around the exterior of the flexible tube members to be discharged from said second openings and through the die openings in a manner that surrounds the flow of the first fiber component through the die openings, to thereby form a sheath-core fiber or continuous filament.

In the preferred embodiment of the present invention, this method also includes the steps of disposing the lower ends of the flexible tube members at the bottom end of the second openings, and mechanically maintaining such lower end of the flexible tube members centered with respect to the second openings particularly maintaining the lower end of each said flexible tube members axially aligned with the second openings and the corresponding die openings, even if the upper end of the flexible tube members is not axially aligned with the second openings.

DESCRIPTION OF THE PREFERRED EMBODIMENT

Figure 1:
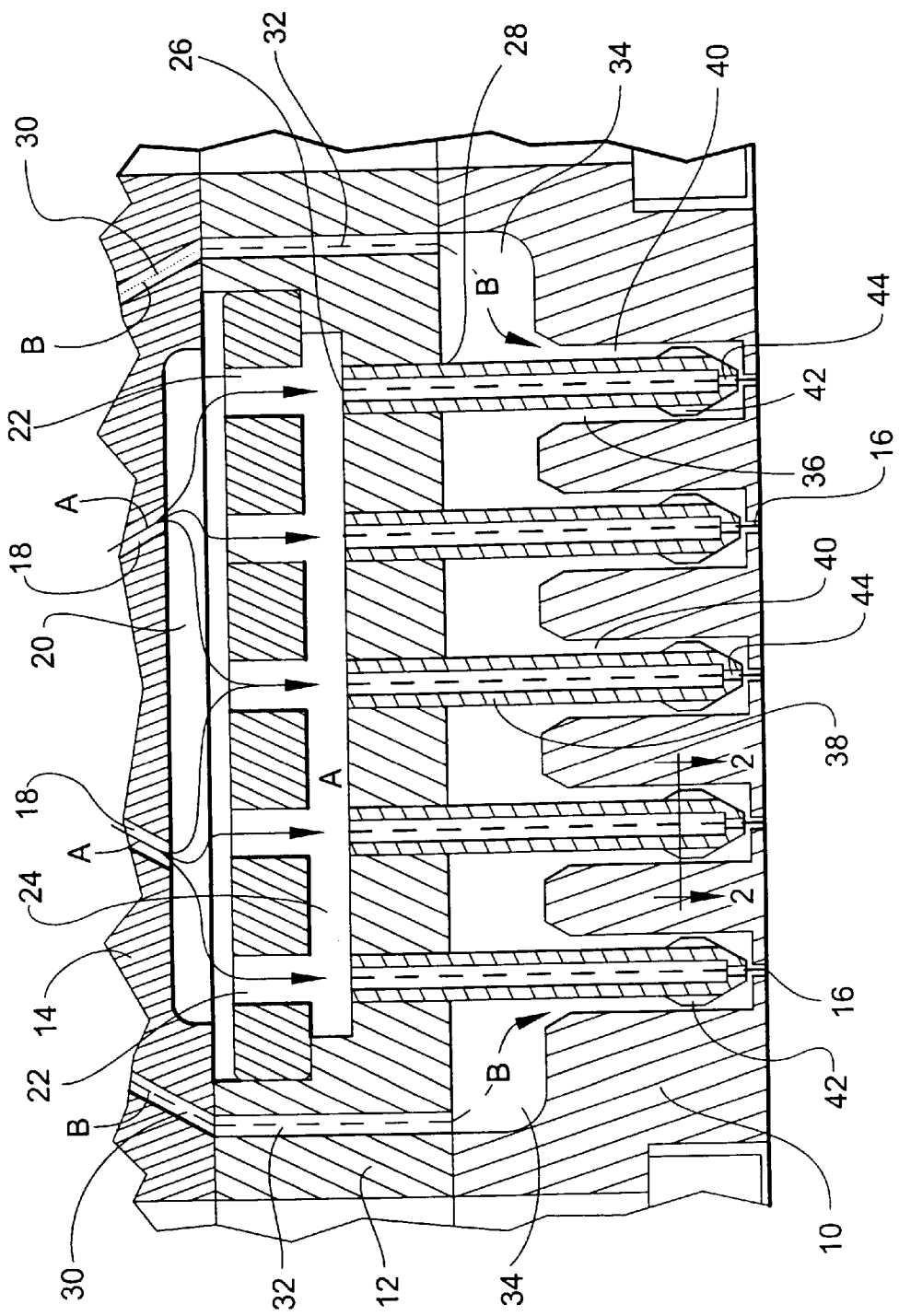
FIG. 1 is a vertical section view taken through an apparatus for forming two component fibers or continuous filaments that embodies the present invention.
Figure 2:
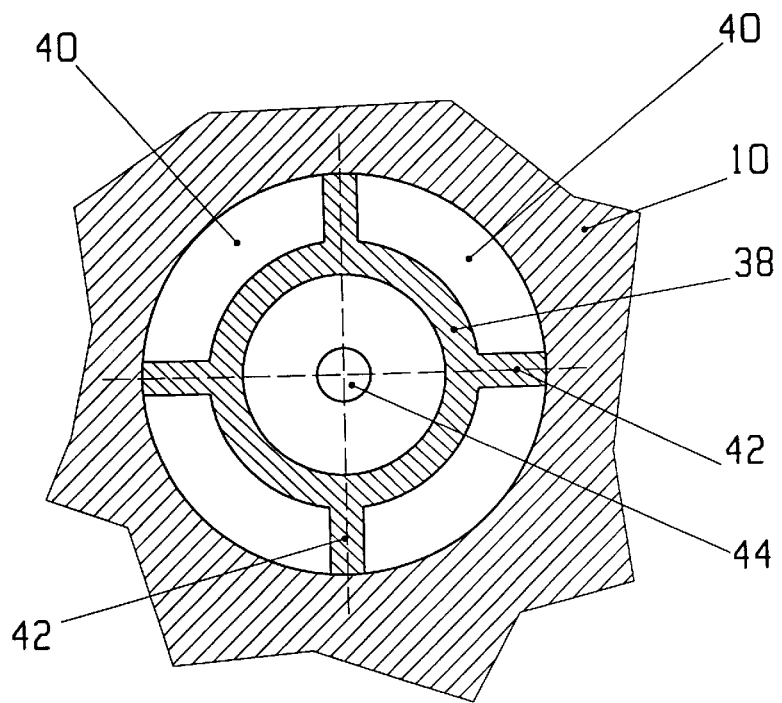
FIG. 2 is a detail view taken along section line 2—2 in FIG. 1.

Looking now in greater detail at the accompanying drawings, FIG. 1 is a diagrammatic view taking along a vertical section through a preferred embodiment of the apparatus for making fibers or continuous filaments in accordance with the present invention.

The apparatus of the present mention includes a die plate 10 juxtaposed and beneath a pre-die plate 12. A distribution system 14 is provided for distributing the molten polymers to such pre-die plate 12.

In the preferred embodiment of the present invention, a complete die may be made up of two rectangular die plates positioned in side-by-side relation, with each rectangular component having a length of one to six meters, or more, and a width of approximately three hundred millimeters. In the bottom surface of the die plate 10, a plurality of die openings 16 are formed with one die opening 16 being positioned at the center of each five millimeter-by-five millimeter surface area on the bottom of the die plate 10. However, it is to be expressly understood that the foregoing dimensions are merely representative of one typical embodiment of the present invention. Other dimensions can be used, depending on the application of the present invention.

The distribution system 14, which is schematically illustrated in FIG. 1, includes distribution channels 18 through which a first molten polymer component A flows into a plenum 20, and then through a first plurality of openings 22 to a second plenum 24. Component A then flows vertically downwardly from the second plenum 24 through a plurality of vertically extending openings 26 which have an outlet end 28 on the bottom face of the pre-die plate 12. The distribution system 14 also includes a second set of conduits 30 through which a second molten polymer component B flows to vertical openings 32 formed in the pre-die plate 12.

The die plate 10 is formed with a relatively large open plenum 34 at its upper face, and this plenum 34 receives component B from the openings 32 in the pre-die plate 12. The bottom portion of the die-plate 10 is formed with a plurality of vertically extending openings 36, each of which is in open communication with the plenum 34, and the bottom end of each opening 36 is in communication with one of the aforesaid die openings 16.

When the die plate 10 and the pre-die plate 12 are juxtaposed as illustrated in FIG. 1, the vertical openings 26 in the pre-die plate 12 are generally axially aligned with the vertical openings 36 in the die plate 10.

In accordance with the present invention, a flexible hollow tube member 38 is mounted in the bottom end of each of the first openings 26 in the pre-die plate 12. The lower end of each flexible tube member 38 extends vertically into the second openings 36 in the die plate 10, in axial alignment therewith.

The flexible tube members 38 are preferably formed of a thin stainless steel that provides the flexibility required of these tube members 38 as will be then explained in greater detail. It is to be understood that the hollow tube members 38 could be formed of any other suitable material.

The lower ends of the flexible tube members 38 have a cross-sectional area that is less than the cross-sectional area of the openings 36. So, a flow channel 40 is provided between the exterior surface of the hollow tube members 38 and the interior surfaces of the vertical openings 36.

Additionally, the bottom ends of the flexible tube members 38 are provided with a plurality of centering vanes 42 that extend outwardly and into an engagement with the walls of the openings 36.

These vanes 42 are dimensioned in order to center the lower end of the flexible tube member 38 in the lower end of the corresponding vertical openings 36 and to maintain the lower end of the flexible tube member 38 axially aligned with the openings 36 even if the upper end of the flexible tube member 38 is not axially aligned with the openings 36, as will also be explained in greater detail presently.

Centering vanes 42 may have a different shape in respect with the illustration shown in FIG. 1, for example they could have polygonal section, or others, with ends in engagement with the walls of the openings 36.

Each of the flexible tube members 38 is provided with a discharge opening 44 located just beneath the centering vanes 42, and the discharge openings 44 are located so to direct the flow of molten polymer therefrom into the center of an adjacent die opening 16.

In operation, the first molten polymer component A, which is indicated in the drawings by the arrows shown in full lines, flows into the pre-die plate 12 from the distribution conduits 18, at which point conventional filters (not shown) may be positioned to filter the molten component A. Component A then flows vertically through the openings 22, then through the second plenum 24 and into the upper end of the openings 26 and downwardly through the interior of the hollow flexible tube members 38 until it is discharged from the discharge opening 44 into the die-opening 16 through which it exits the die plate 10.

At the same time, a second molten component B, which is indicated in the drawings by the arrows shown in dotted lines, flows through the distribution conduits 30 to the vertical openings 32 and the pre-die plate 12. Component B so reaches the open plenum 34 at the upper end of the die plate 10 then flows downwardly through the flow channels 40 between the hollow flexible tube members 38 and the openings 36.

Component B collects at the lower end of the vertical openings 36, and is discharged through the die openings 16 in a manner that surrounds component A as it is being discharged from the discharge opening 44 of the tube members 38 and into the die openings 16.

Thus, when the components A and B exit the die plate 10 through the die opening 16, they will form a sheath-core fiber or continuous filament with component A forming the core and component B forming the sheath.

Figure 4:
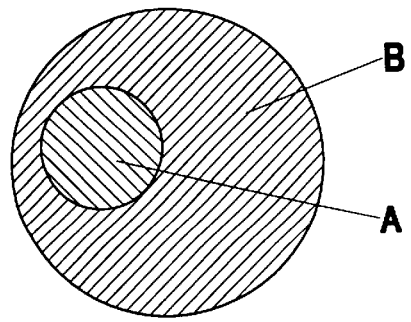
FIG. 4 is detail cross-sectional view similar to FIG. 3 but with core component centered.

Looking at FIG. 1, it will be noted that the openings 26 in the pre-die plate 12 must be axially aligned with the openings 36 in the die plate 10 to form a sheath-core fiber in which the core is centered with respect to the sheath, and with respect to the axis of the same sheath-core fiber. However, as discussed above, these openings 26 and 36 are very small in diameter, and even the slightest misalignment of the openings 26 and 36 can result in the core component being offset from the center of the fiber, as illustrated in FIG. 4, with all of the adverse consequences discussed above.

It will also be appreciated that the continuous flow of the molten components A and B through the die plate 10 and the pre-die plate 12 results in the temperature of both plates being at a high temperature level which can, and usually does, cause some distortion of the dimensions of the die plate 10 and the pre-die plate 12, and in view of the close tolerances required for the alignment of the small openings 26 with the small openings 36, any such temperature induced distortion can result in the aforesaid undesirable misalignment of the same openings 26 and 36.

By virtue of the unique features of the present invention, the misalignment of the openings 26 and 36 can be accommodated without adversely effecting the centering of core component A with sheath component B. Most specifically, since the upper ends of the hollow flexible tube members 38 are disposed within the open plenum 34 they are free to move within the plenum 34 if, for whatever reason, the outlet ends 28 of the openings 26 become misaligned with the openings 36 in the die plate 10. Moreover, the presence of the centering vanes 42 will assure that the lower end of the flexible tube members 38 will also be maintained centered with respect to the openings 36, and the lower end will also be maintained in axial alignment with the die opening 16 even if the upper end of the flexible tube members are flexed as a result of some misalignment between the openings 26 and the openings 36.

Figure 3:
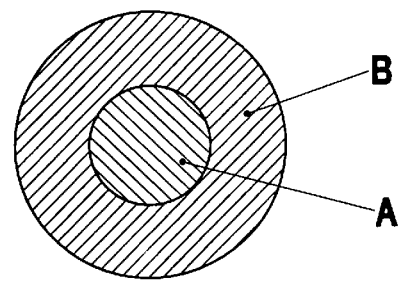
FIG. 3 is a detail cross sectional view a sheath-core fiber formed with the core component offset from the center of the sheath component and from the center of the fiber.

In this way the centering, or axial alignment, between openings 44 of flexible tube members 38 and openings 16 of the die plate 10. Accordingly, the flexible tube members 38 will cause the two component fiber formed by the die plate 10 to always position the core component A at the center of the two component fiber as illustrated in FIG. 3 even if there is some misalignment between the small openings 26 and 36 that would otherwise form a two-component fiber as shown in FIG. 4 with the core component A offset from the center of the fiber.

The continuous filaments obtained through the method and apparatus of the present invention, are suitable in particular, to be used as staple fibers (cut fibers), spun bonding non-wovens, melt blown or other applications.

What is claimed is:

1. Apparatus for making fibers or continuous filaments consisting of a first (A) and a second (B) components, said apparatus including:

(a) a first plate (12) having an inlet (18) for receiving said first fiber component (A), and having a first plurality of openings (26) through which said first fiber component (A) flows to an outlet end (28) in said openings (26);

(b) a second plate (10), juxtaposed with said plate (12) and having a second plurality of openings (36) therein, which are generally axially aligned with said first plurality of openings (26) in said first plate (12), and said second plate (10) having a flow channel permitting said second fiber component (B) to flow to said second openings (36) and out through an outlet end of said second openings; and (c) a plurality of flexible hollow tube members (38) being mounted to extend axially into said second plurality of openings (36), such flexible hollow tube members (38) having one end being located adjacent said outlet end (28) of one of said first plurality of openings (26), with the other end of each said flexible tube member (38) being located adjacent the outlet end of said second openings (36), said flexible tube members (38) having a cross-sectional area less than the cross-sectional area of said second openings (36) and being sufficiently flexible to accommodate any misalignment of said first openings (26) relative to said second openings (36) without adversely affecting the flow of said first and second fiber components, and said flexible tube members (38) including structural elements extending between said flexible tube members (38) and the interior wall of said second openings (36) to center said other end of said flexible tube members (38) in such second openings (36).

2. Apparatus for making fibers as defined in claim 1, wherein said structural elements comprise centering vanes (42) located at said other end of said flexible tube members (38) which extend outwardly and into engagement with the wall of said second openings (36), said vanes being dimensioned to center said other end of said flexible tube member (38) in said second opening (36).

3. Apparatus for making fibers as defined in claim 2, wherein said vanes (42) are dimensioned to maintain said other end of each said flexible tube member (38) axially aligned with said second openings (36) even if said one end of said flexible tube member is not axially aligned with said second openings.

4. Apparatus for making fibers as defined in claim 1, wherein said flexible tube members (38) are mounted in said first openings (26) of said first plate (12) at said outlet end (28) thereof.

5. Apparatus for making fibers as defined in claim 1, wherein said second plate (10) includes die openings (16) adjacent said outlet end of said second openings (36) and in fluid communication therewith so that said second component (B) flows from said second openings (36) into said die openings (16), and wherein said other end of each said flexible tube member (38) has a discharge opening (44) directing the flow of said first fiber component into said die opening (16) within the flow of said second fiber component (B).

6. Apparatus for making fibers or continuous filaments consisting of a first (A) and a second (B) components, said apparatus including:

(a) a first upper plate (12) having an inlet (18) for receiving said first fiber component (A), and having a first plurality of openings (26) through which said first fiber component (A) flows to an outlet end (28) in said openings (26);

(b) a second lower plate (10) juxtaposed with said first upper plate (12) and having a second plurality of openings (36) therein, said second plurality of openings (36) being generally axially aligned with said first plurality of openings (26) in said first plate (12), said second plate (10) having a plurality of die openings (16) disposed in the bottom face of said second lower plate and being in fluid communication with said second openings (36), and said second plate (10) having a flow channel (40) permitting said second fiber component (B) to flow to said second openings (36) and out through an outlet end of said second openings (36) to said die openings (16); and (c) a plurality of flexible hollow tube members (38) mounted at one end thereof in the outlet end (28) of each said first openings (26) and extending axially into said second plurality of openings (36) with the other end of each said flexible tube members (38) being located adjacent the outlet end said second openings (36), said flexible tube members (38) having a cross-sectional area less than the cross-sectional area of said second openings (36) and each said flexible tube members having centering vanes (42) located at said other end thereof which extend outwardly and into engagement with the walls of said second openings (36), said vanes being dimensioned to center said other end of said flexible tube members (38) in said second openings (36) and to maintain said other end of each said flexible tube members (38) axially aligned with said second openings (36) even if said one end of said flexible tube member (38) is not axially aligned with said second openings (36), and with each said flexible tube member (38) having a discharge opening (44) directing the flow of said first fiber component (A) into said die opening (16) within the flow of said second fiber component (B), and said flexible members (38) being sufficiently flexible to accommodate any misalignment of said first openings (26) relative to said second openings (36) without adversely affecting the flow of said first and second fiber components through said upper (12) and lower (10) plates.

* * * * *